(12) United States Patent
Huang et al.

(10) Patent No.: US 9,563,513 B2
(45) Date of Patent: Feb. 7, 2017

(54) O(1) VIRTUAL MACHINE (VM) SNAPSHOT MANAGEMENT

(71) Applicant: International Business Machines Corporation, Armonk, NY (US)

(72) Inventors: Hai Huang, Danbury, CT (US); Chunqiang Tang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 14/510,196

(22) Filed: Oct. 9, 2014

(65) Prior Publication Data
US 2016/0103739 A1    Apr. 14, 2016

(51) Int. Cl.
G06F 11/00    (2006.01)
G06F 11/14    (2006.01)
G06F 9/455    (2006.01)
G06F 9/46    (2006.01)
G06F 9/50    (2006.01)

(52) U.S. Cl.
CPC ....... *G06F 11/1451* (2013.01); *G06F 9/45558* (2013.01); *G06F 9/461* (2013.01); *G06F 9/5077* (2013.01); *G06F 2009/45591* (2013.01); *G06F 2201/815* (2013.01); *G06F 2201/84* (2013.01)

(58) Field of Classification Search
USPC ......................................................... 714/4.1
See application file for complete search history.

(56) References Cited

U.S. PATENT DOCUMENTS

| | | | |
|---|---|---|---|
| 2012/0130949 A1 | 5/2012 | Picken et al. | |
| 2013/0080734 A1* | 3/2013 | Sato | G06F 12/1027 711/207 |
| 2013/0173551 A1 | 7/2013 | Keller et al. | |
| 2013/0283092 A1* | 10/2013 | Das | G06F 11/1484 714/3 |
| 2014/0281217 A1* | 9/2014 | Beam | G06F 3/0607 711/114 |
| 2016/0011946 A1* | 1/2016 | Simon | G06F 11/1469 714/19 |

* cited by examiner

*Primary Examiner* — Sarai Butler
(74) *Attorney, Agent, or Firm* — David Zwick

(57) ABSTRACT

Managing a virtual machine snapshot in O(1) time by initially storing data from a virtual machine executing under a host operating system, to a first host operating system managed data block and creating a first pointer that points to the first host operating system managed data block and associates the virtual machine to the data stored in the first host operating system managed data block. A first value, associated with the first host operating system managed data block, is initialized indicating the number of pointers created to associate the virtual machine to the first host operating system managed data block. Receiving, by the computer host operating system, a request to create a snapshot of the virtual machine creates a second pointer replicating the first pointer, and increments, by the computer host operating system, the first value associated with the first host operating system managed data block.

20 Claims, 10 Drawing Sheets

O(1) VIRTUAL MACHINE (VM) SNAPSHOT MANAGEMENT

BACKGROUND

The present disclosure relates generally to management of virtualized environments and more particularly to snapshot management.

In computer systems, a snapshot is the state of a system and/or its constituent files at a particular point in time. High-availability systems may perform a backup of a large data set as a read-only snapshot, allowing applications to continue writing to their data while preserving a copy for recovery. Virtualization, sandboxing and virtual hosting may use read-write snapshots, which create diverging versions of the data, to manage changes to large sets of files. Many read-write snapshot implementations, such as VMware®'s VMDK (Virtual Machine Disk), Kernel based Virtual Machine's (KVM®) Quick EMUlator Copy on Write (QCOW), and IBM®'s Flashcopy, only save file data when the data in a snapshotted file is modified, making the time and computer resources, such as storage and processor cycles, required to create a snapshot of a file independent of the size of the file, or O(1).

The big O notation of O(1) is used in Computer Science to describe the performance or complexity of an algorithm. O(1) describes an algorithm that will always execute in the same time (or space) regardless of the size of the input data set. In other words, the time and I/O needed to create the snapshot does not increase with the size of the data set.

SUMMARY

Embodiments of the present invention disclose a method, computer program product, and system for managing a virtual machine snapshot in O(1) time. A computer host operating system initially stores data from a virtual machine executing under the host operating system, to a first host operating system managed data block. The computer host operating system creates a first pointer that points to the first host operating system managed data block and associates the virtual machine to the data stored in the first host operating system managed data block, initializes a first value associated with the first host operating system managed data block indicating the number of pointers created to associate the virtual machine to the first host operating system managed data block. The computer host operating system receives a request to create a snapshot of the virtual machine, creates a second pointer replicating the first pointer, and increments the first value associated with the first host operating system managed data block.

In another aspect of the invention, the computer host operating system receives an initial request from the virtual machine to update the data stored in the first host operating system managed data block. The computer host operating system stores the updated data received from the virtual machine to a second host operating system managed data block, adjusts the second pointer to point to the second host operating system managed data block, thereby associating the virtual machine to the updated data stored in the second host operating system managed data block, initializes a second value associated with the second host operating system managed data block indicating the number of pointers created to associate the virtual machine to the second host operating system managed data block, and decrements the first value associated with the first host operating system managed data block.

In another aspect of the invention, the computer host operating system receives a request from the virtual machine to delete the data stored in the first host operating system managed data block. The computer host operating system adjusts the second pointer to not point to the first host operating system managed data block and decrements the first value associated with the first host operating system managed data block.

In another aspect of the invention, the computer host operating system receives a request to roll back the snapshot of the virtual machine. The computer host operating system decrements the first value associated with the first host operating system managed data block, if the second pointer points to the first host operating system data block, or decrements the second value associated with the second host operating system managed data block, if the second pointer points to the second host operating system data block, and based on the second value associated with the second host operating system managed data block indicating no second pointers point to the second host operating system managed data block, releases the second host operating system managed data block asynchronous to the second value indicating no second pointers point to the second host operating system managed data block.

In another aspect of the invention, the computer host operating system receives a request to delete the snapshot of the virtual machine. The computer host operating system decrements the first value associated with the first host operating system managed data block, and based on the first value associated with the first host operating system managed data block indicating no first or second pointers point to the first host operating system managed data block, releases the first host operating system managed data block asynchronous to first value indicating no first or second pointers point to the first host operating system managed data block.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
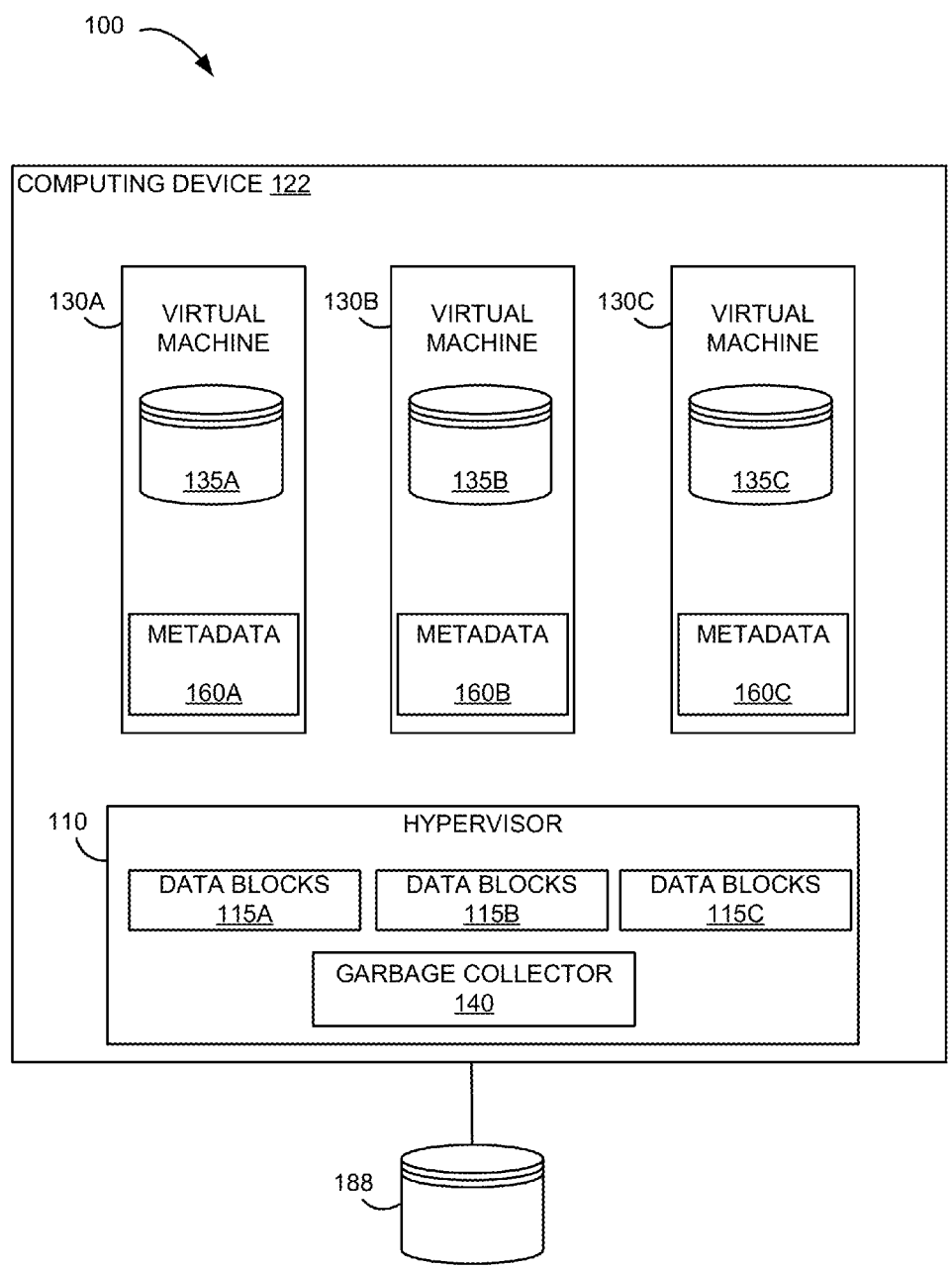
FIG. 1 illustrates a functional block diagram of an exemplary virtual machine environment, in accordance with an embodiment of the present disclosure.

In a virtual machine environment, a computing device includes a host machine and one or more guest machines. A guest machine, or virtual machine (VM), functions as if it were a physical machine executing an independent instance of an operating system, along with its associated software and information. A host machine is the underlying hardware and software that provide computing resources, such as processing power, memory, disk and network I/O (input/output), to support the VMs.

Host machines, in a virtual machine environment, may provide snapshot functionality to the VMs supported by them. This functionality may include the ability to create a snapshot of an individual VM file or of an entire VM file system, the ability to roll back any changes made to the file(s) after the snapshot is created, and the ability to delete obsolete versions of the file(s). In a large virtualized environment, in which large numbers of VMs may be performing snapshot creates, snapshot roll backs, or snapshot deletes simultaneously, it may be critical that these snapshot functions perform as efficiently as possible, utilizing the least amount of shared host resources.

Many current snapshot implementations provide O(1) snapshot creation support, but may provide O(n) snapshot roll back and/or snapshot delete support. O(n) means the amount of resources or time required to perform the function grows linearly, and in direct proportion, to the amount of data. Snapshot implementations, such as VMDK images or QCOW file formats may provide O(1) performance for snapshot create and snapshot roll back, because snapshot create saves no data until changes are made (at which time changed data is saved to a delta file) and because snapshot roll back simply deletes the delta file. Conversely, a snapshot delete for these implementations must merge all the changes saved in the delta file back into the original file. Because the time and/or resources needed to merge the changes back into the original file is directly proportional to the amount of data changed, O(n) performance may be expected for the snapshot delete.

Similarly, snapshot implementations, such as Flashcopy provide O(1) performance for snapshot create and snapshot delete, because snapshot create saves no data until changes are made (at which time the original data is saved to a destination file and the original source file is updated) and because snapshot delete simply deletes the destination file. Conversely, a snapshot roll back for this implementation must merge all the original data saved in the destination file back into the changed source file. Because the time and/or resources needed to merge the original data back into the changed source file is directly proportional to the amount of original data saved, O(n) performance may be expected for the snapshot roll back.

The amount of data requiring host machine time and/or resources for an O(n) deletion or roll back may increase with each change made to the data file after the snapshot is created. The utilization of more host resources and/or time to roll back or delete a snapshot may delay not only the VM performing the roll back or delete function, but any other VMs requiring the host resources being utilized by the snapshot deletion or roll back. In a large virtualized environment, O(n) snapshot performance may affect the performance of the plurality of the VMs sharing the required resources of the host machine.

Various embodiments of the present disclosure may provide O(1) snapshot rollback functionality and O(1) snapshot delete functionality, in addition to O(1) snapshot create functionality, allowing large virtualized environments to manage VM snapshots with consistent resource utilization and consistent performance, regardless of the amount of data changed after the snapshot or the number of VMs executing snapshot functions simultaneously. Certain embodiments may snapshot the state of a VM system and the VM system's memory in addition to the file system of the VM.

FIG. 1 illustrates a functional block diagram of an exemplary virtual machine environment 100, in accordance with an embodiment of the present disclosure. Virtual machine environment 100 may include a computing device 122 and storage 188. Computing device 122 may include one or more VMs 130A, 130B, 130C, each of which may include one or more virtual disks 135A, 135B, 135C and metadata 160A, 160B, 160C; a hypervisor 110; a garbage collector 140; and one or more sets of data blocks 115A, 115B, 115C, all of which may be stored, for example, on a computer readable storage medium, such as computer readable storage medium (media) 430 (FIG. 4), portable computer readable storage medium (media) 470, and/or RAM(S) 422.

Storage 188 may be one or more computer readable storage medium (media), such as computer readable storage medium (media) 430 (FIG. 4), portable computer readable storage medium (media) 470, and/or RAM(S) 422. In various embodiments, storage 188 may be a storage subsystem that includes a controller and disk drives. The controller may communicate with hypervisor 110, for example, over a host bus adapter (HBA) that allows a Small Computer System Interface (SCSI) storage device to communicate with the operating system. In various embodiments, storage 188 may be a stand-alone hardware appliance that hosts one or more storage devices (such as disk drives, tape drives, optical drives) and is peripheral to computing device 122. Storage 188 may be locally attached to computing device 122 or may be externally accessed through a network (for example, the Internet, a local area network or other, wide area network or wireless network) and network adapter or interface 436. The network may comprise copper wires, optical fibers, wireless transmission, routers, firewalls, switches, gateway computers, and/or edge servers.

Hypervisor 110, a virtual machine monitor, may be computer software, firmware or hardware that executes on computing device 122, and intermediates between the computing device 122 and a VM 130. Hypervisor 110 may isolate individual VMs 130 from each other, enabling computing device 122 to support a plurality of VMs 130 executing a plurality of heterogeneous operating systems. Hypervisor 110 may present each VM 130 with a virtual operating platform and may manage the execution of each VM 130. Hypervisor 110 may control the processor and resources of computing device 122, allocating what is needed to each VM 130, and ensuring that one VM 130 cannot disrupt any other VM 130 on the computing device 122.

Hypervisor 110 may manage the data associated with VM 130 files. Hypervisor 110 may map VM 130 file data in one or more data blocks. A set of data blocks 115 may constitute all the data in one or more files in a VM 130 file system. The bigger the VM 130 file, the more data blocks it will take to store all of the file's data. A set of data blocks 115 may reside in hypervisor 110 storage or in files maintained in the file system of hypervisor 110.

In various embodiments, hypervisor 110 may maintain a reference count for each data block in the set of data blocks 115A, 115B, 115C. In various embodiments, reference counts may be initialized when a VM 130 is created and its file system established. In various embodiments, hypervisor 110 may increase the value in the reference counts for data blocks when a snapshot of a file is created, and may decrement the value in the reference counts each time a snapshot is rolled back or a version of a file is deleted. In certain embodiments, one or more VMs 130 may share files.

Hypervisor 110 may, in various embodiments, increment the value in the reference counts for shared data blocks associated with the shared files whenever a VM 130 sharing the file is created.

In certain embodiments, the reference counts may be maintained by the storage subsystem 188, rather than the hypervisor 110.

Each of the plurality of VMs 130 may appear to have the processor 420 (FIG. 4), memory 422, 424, and other resources of computing device 122 all to itself. When a VM 130 saves its files, for example to a disk, it is actually saving the file to a virtual disk 135.

A virtual disk 135 may be a logical disk or volume with which a VM 130 performs I/O operations. The VM 130 is unaware that the virtual disk 135 is not directly managed by the VM 130, but is instead managed by the hypervisor 110. The hypervisor 110 may perform the I/O and save the file's data blocks to physical storage 188 by translating the virtual disk 135 and LBA (logical block addressing), to which the VM 130 file was saved, into a physical disk identifier and LBA.

Because the file data of a VM 130 may actually be stored in a set of data blocks 115 in the hypervisor 110, each VM 130 may, in various embodiments, include metadata 160 that connects the VM 130 with the set of data blocks 115 in the hypervisor 110 that are associated with its file system.

Metadata 160 may, in various embodiments, be a mapping table, such as a list of pointers, which maps the data from one or more VM files to the associated data blocks in the hypervisor 110. In various embodiments, VM 130 may keep a plurality of metadata 160 versions.

In various embodiments, a new version of metadata 160 may be created each time a snapshot of a file is created. A VM 130 may delete a metadata 160 version, in various embodiments, when its corresponding snapshot rolls back to an earlier version. A VM 130 may also delete a metadata version 160, in various embodiments, when a snapshot delete deletes its corresponding version. Metadata 160 versions may be associated with a particular file or may be associated with an entire file system. Metadata versioning will be discussed in further detail with reference to FIGS. 2A-2F.

Garbage collector 140 may, in various embodiments, execute under the hypervisor 110 and release, or free, any storage 188 associated with a data block whose reference count value is zero. Garbage collector 140 may locate any data block, for any VM 130, whose reference count value is zero and free the storage for that data block. Garbage collector 140 may translate a data block, whose reference count value is zero, into the physical disk identifier and LBA to be freed on storage 188.

Garbage collector 140 may, in various embodiments, run asynchronously and be disassociated from snapshot processing. Garbage collector 140 may, in various embodiments, be invoked periodically by hypervisor 110 on a time interval basis. In certain embodiments, garbage collector 140 may execute when computing device 122 has processing cycles to spare, such as when the central processing unit (CPU) is being utilized below a predetermined threshold percentage. In various embodiments, garbage collector 140 may execute when the amount of available memory for storing data blocks or the amount of available storage blocks in storage 188 falls below a determined threshold value or below a determined percentage threshold of the total storage in storage 188. In various embodiments, the time interval, threshold percentage of CPU utilization, and threshold value or percentage of free memory/storage may be configurable.

Metadata 160 versioning for snapshot functionality, along with asynchronous garbage collection, disassociated from snapshot processing, may provide O(1) snapshot creation, O(1) snapshot roll back and O(1) snapshot delete functionality.

Computing device 122 represents a computing device, system or environment, and may be a laptop computer, notebook computer, personal computer (PC), desktop computer, tablet computer, thin client, mobile phone or any other electronic device or computing system capable of performing the required functionality of embodiments of the disclosure. Computing device 122 may include internal and external hardware components, as depicted and described in further detail with respect to FIG. 4. In other various embodiments of the present disclosure, computing device 122 may represent a computing system utilizing clustered computers and components to act as a single pool of seamless resources. In general, computing device 122 is representative of any programmable electronic devices or combination of programmable electronic devices capable of executing machine-readable program instructions in accordance with an embodiment of the disclosure.

FIGS. 2A-2F depict metadata 160A, 170, data blocks 215, and reference counts 222 for a virtual VM file 230, in accordance with an embodiment of the disclosure. In various embodiments, the data blocks 215, in the exemplary set of data blocks 115A, may reside in hypervisor 110 storage or in the file system of the hypervisor 110, and may include the data of virtual VM file 230. Virtual VM file 230 may also have a physical presence in storage 188.

The metadata 160A, in exemplary virtual machine 130A, may include pointers 261 mapping file 230, in VM 130A, with its data blocks 215 residing in the hypervisor 110. In various embodiments, the storage for exemplary metadata 160A may be created with enough space for pointers 261 to data blocks 215 for the maximum data size defined for VM file 230, even if not all pointers 261 in metadata 160A are immediately used. In other embodiments, metadata 160 may be created with enough space for pointers 261 to data blocks for the entire file system established for VM 130A.

In the exemplary embodiment, the set of reference counts 221 resides in and is managed by a storage controller 220. In other embodiments, the set of reference counts 221 may reside in hypervisor 110 storage or in the hypervisor 110 file system.

Storage controller 220 may be hardware, software, or firmware controlling the space in storage 188. In various embodiments, the set of reference counts 221 may be created large enough to include a reference count 222 for each physical block in storage 188. Hypervisor 110 may communicate with storage controller 220 over an HBA each time a data block 215 requires a reference count 222 value update. In various embodiments, reference count 222 values for unused physical blocks in storage 188 may be set to zero. In certain embodiments, the counters 222 for unused physical blocks in storage 188 may be set to a value other than zero, for example "−1", to indicate the physical storage 188 associated with the reference count 222 is unused. In certain embodiments, a reference count 222 with a value of zero may be an indication to garbage collector 140 that a data block 215 and the physical storage 188 for that data block 215 need to be freed.

In various embodiments, when VM 130 creates a file, for example file 230, or adds data to the file, VM 130 may request a data block 215 from hypervisor 110. Hypervisor 110 may obtain a block of storage, for example a data block 215, and may return the address of the data block 215 to VM 130, which may put a pointer 261 to that address in metadata 160, thus linking the VM 130 to the data block 215. Hypervisor 110 may then link the obtained data block 215 to a physical block in storage 188 and update the reference count 222 value associated with the physical block in storage 188. In various embodiments, hypervisor 110 may also obtain a new data block 215 for modified data in file 230 when the reference count 222 value for the modified data block 215 is greater than one, indicating that more than one version of file 230 may be referencing the data block 215 and/or another VM is sharing file 230 and the data blocks 215. In various embodiments, data blocks 215, and their associated storage 188, may be deleted when they are no longer being referenced (or pointed to) by any metadata pointers 261 and their reference count values are zero.

Metadata pointers 261 and reference counts 222 may, in various embodiments, be contiguous in storage. In other embodiments they may be tables, arrays, linked lists or any other suitable structure. The set of data blocks 115A may be contiguous or non-contiguous in storage. In various embodiments, a data block 215 may utilize storage in storage 188 only when the data block 215 contains data.

Figure 2A:
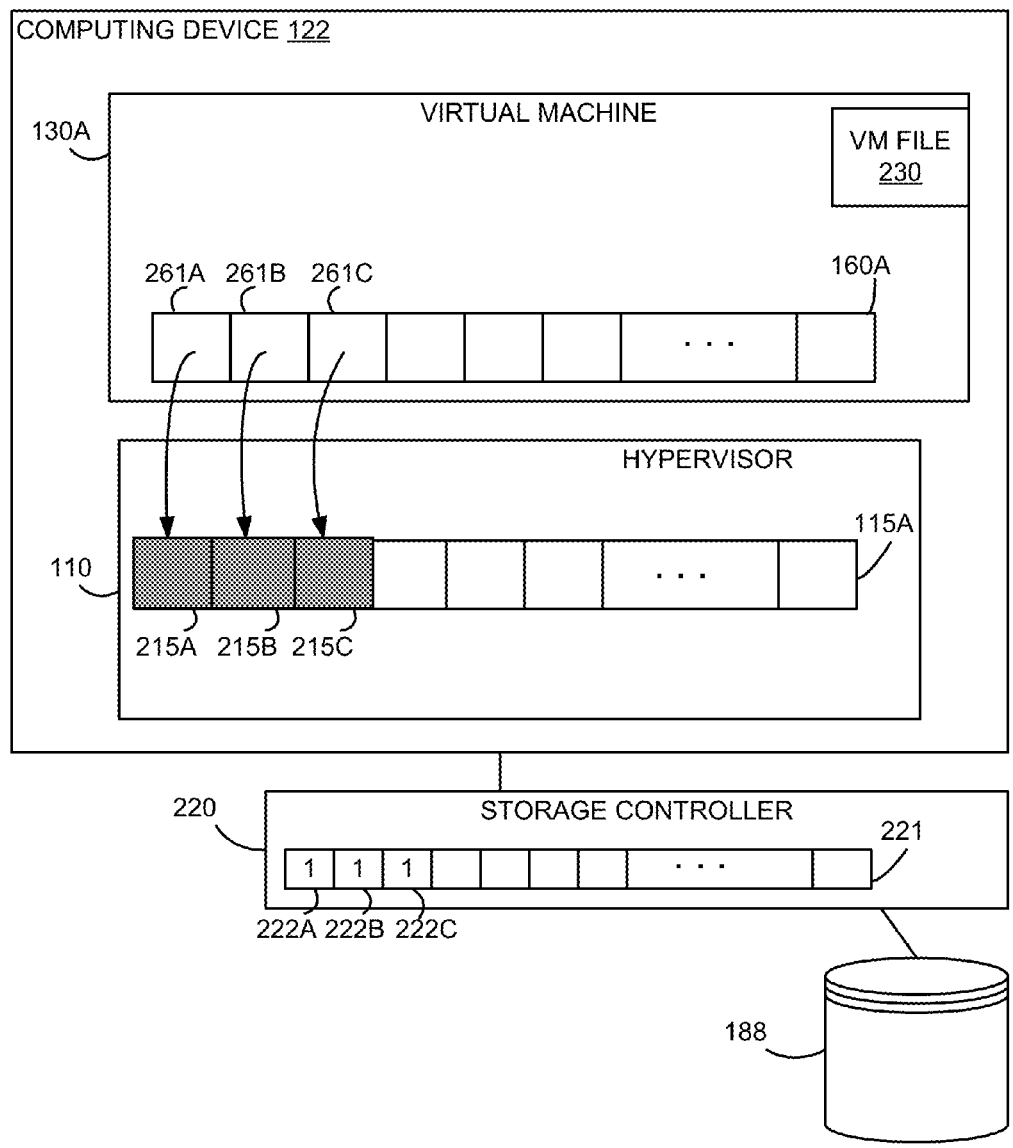
FIGS. 2A-2F depict metadata, data blocks, and reference counts for a VM file, in accordance with an embodiment of the disclosure.

FIG. 2A depicts metadata 160A, data blocks 215, and reference counts 222 for a VM file 230, in accordance with an embodiment of the disclosure. FIG. 2A depicts an exemplary VM 130A with one exemplary VM file 230 that has three blocks of data. In various embodiments, the metadata 160A, for exemplary VM 130A, may include three pointers 261A, 261B and 261C, pointing to the data blocks 215A, 215B, 215C, respectively, each data block 215 including a block of data from the exemplary file 230. Metadata 160A may, in various embodiments, reference the current version of the exemplary file 230. Because FIG. 2A depicts a single version of the exemplary file 230 (the "current" version), each data bock 215A, 215B, 215C may only be referenced by metadata 160A, and the reference count 222A, 222B, 222C values for data blocks 215A, 215B and 215C, respectively, may, each be initialized to one.

In various embodiments the remainder of the reference count 222 values in the exemplary set of reference counts 221 may be set to zero or may be set to another value that indicates there are no blocks of data 215 associated with this reference count 222. In certain embodiments, a reference count value of zero may be an indication to garbage collector 140 that the physical storage, computing device 122 memory and/or storage 188, backing a data block is ready to be freed.

Figure 2B:
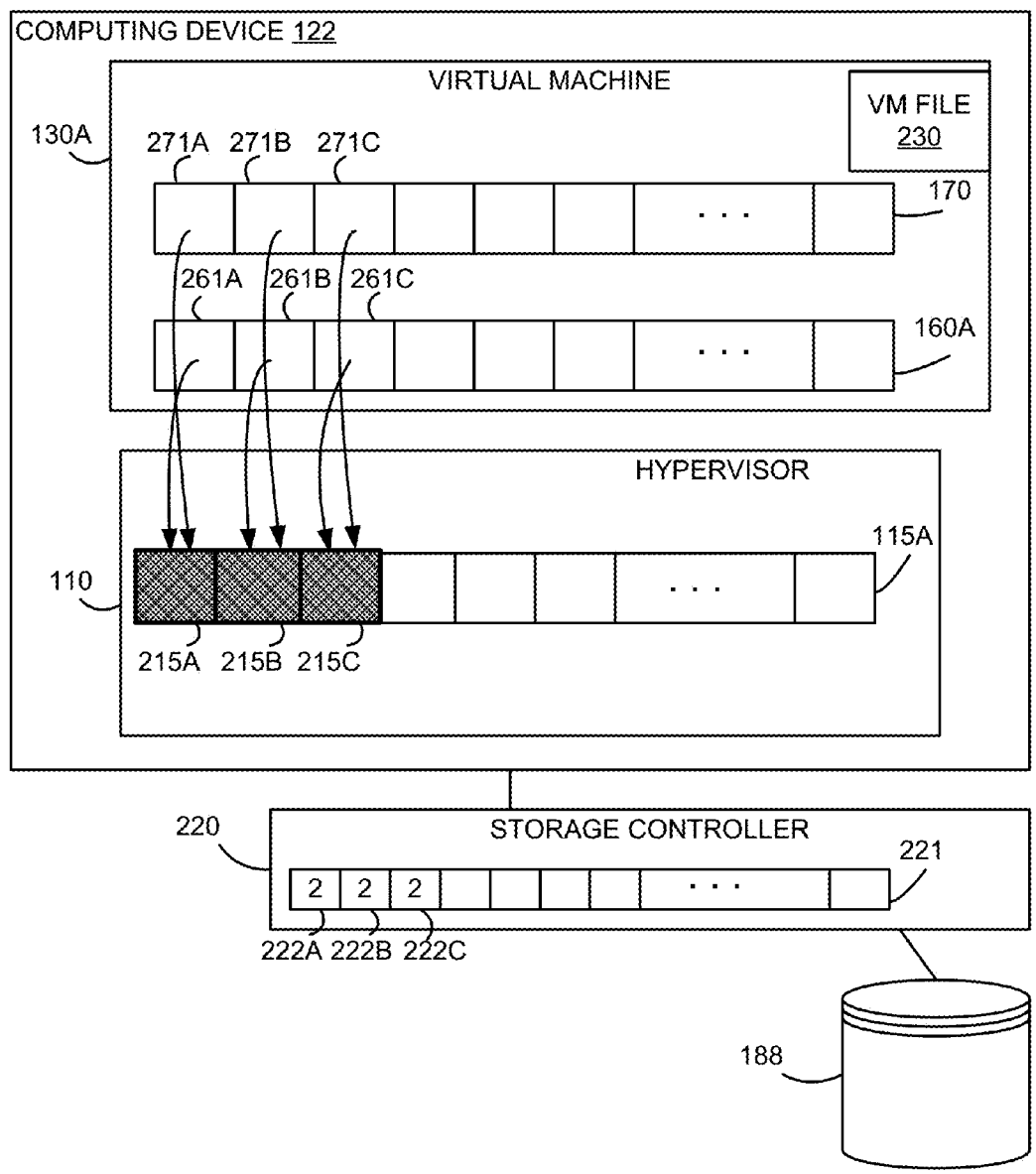

FIG. 2B depicts metadata 160A, 170, data blocks 215, and reference counts 222 for a VM file 230, in accordance with an embodiment of the disclosure. FIG. 2B depicts exemplary VM 130A after a snapshot is created for exemplary file 230. In various embodiments, metadata 160A may now reference the snapshot version of the data for the exemplary file 230, rather than the current version, and may include pointers 261A, 261B, and 261C to the snapshot data blocks 215A, 215B, and 215C respectively. The pointers in metadata 160A may, in various embodiments, remain static, referencing the data at the time of the snapshot. In various embodiments, a snapshot may create a new metadata 170 to represent the current version of exemplary file 230. Metadata 170 may initially include pointers 271A, 271B, 271C to the snapshot data blocks 215A, 215B, 215C, but, in various embodiments, metadata 170 pointers 271 may be modified as data is added, changed or deleted in the exemplary file 230. In various embodiments, hypervisor 110 may increment the reference count 222A, 222B, 222C values for data blocks 215A, 215B and 215C, respectively, to two when the new metadata 170 is created to reflect data blocks 215A, 215B and 215C may now be referenced as both a current version of the data (referenced by metadata 170) and a snapshot version of the data (referenced by metadata 160A).

Figure 2C:
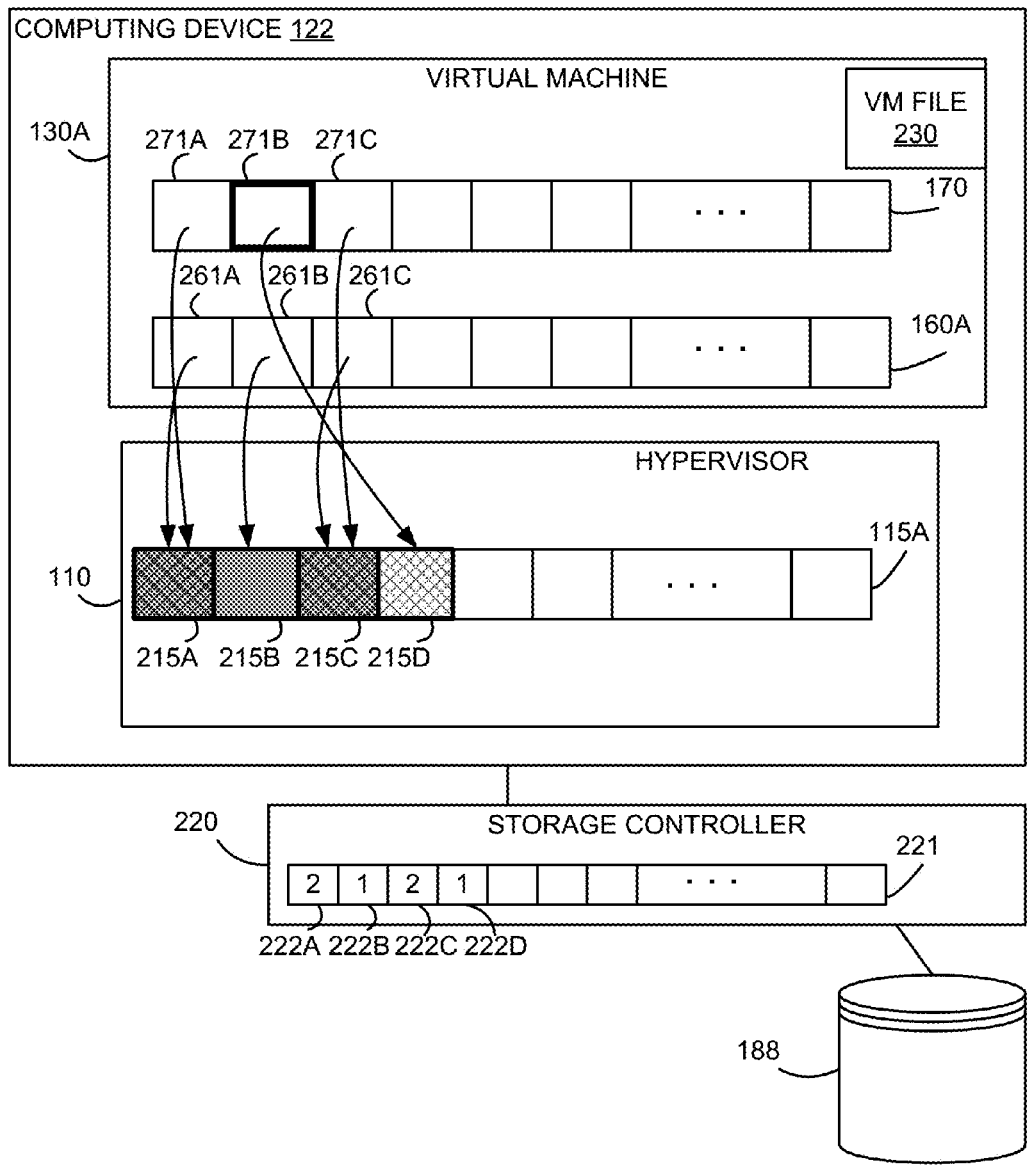

FIG. 2C depicts metadata 160A, 170, data blocks 215, and reference counts 222 for a VM file 230, in accordance with an embodiment of the disclosure. FIG. 2C depicts exemplary VM 130A after the data in data block 215B, in exemplary file 230, has been modified. Because data block 215B, in this example, is referenced by multiple metadata pointers 261B, 271B, as may be determined by the reference count 222B value being greater than one, hypervisor 110 may, in various embodiments, obtain a new data block 215D (and a block in storage 188) to write into for the modified data, instead of overwriting the data in data block 215B. The snapshot version of the data in data block 215B, along with metadata 160A referencing the snapshot version of the data, may remain unchanged. Metadata 170, representing the current version of the exemplary file 230, may in various embodiments, adjust metadata pointer 271B to point to the newly obtained data block 215D with the modified data. Hypervisor 110 may, in various embodiments, decrement the reference count 222B value for data block 215B to reflect that metadata 170 (reflecting the current version of exemplary file 230) no longer references data block 215B. Hypervisor 110 may initialize the reference count 222D value for the newly obtained data block 215D to one.

Figure 2D:
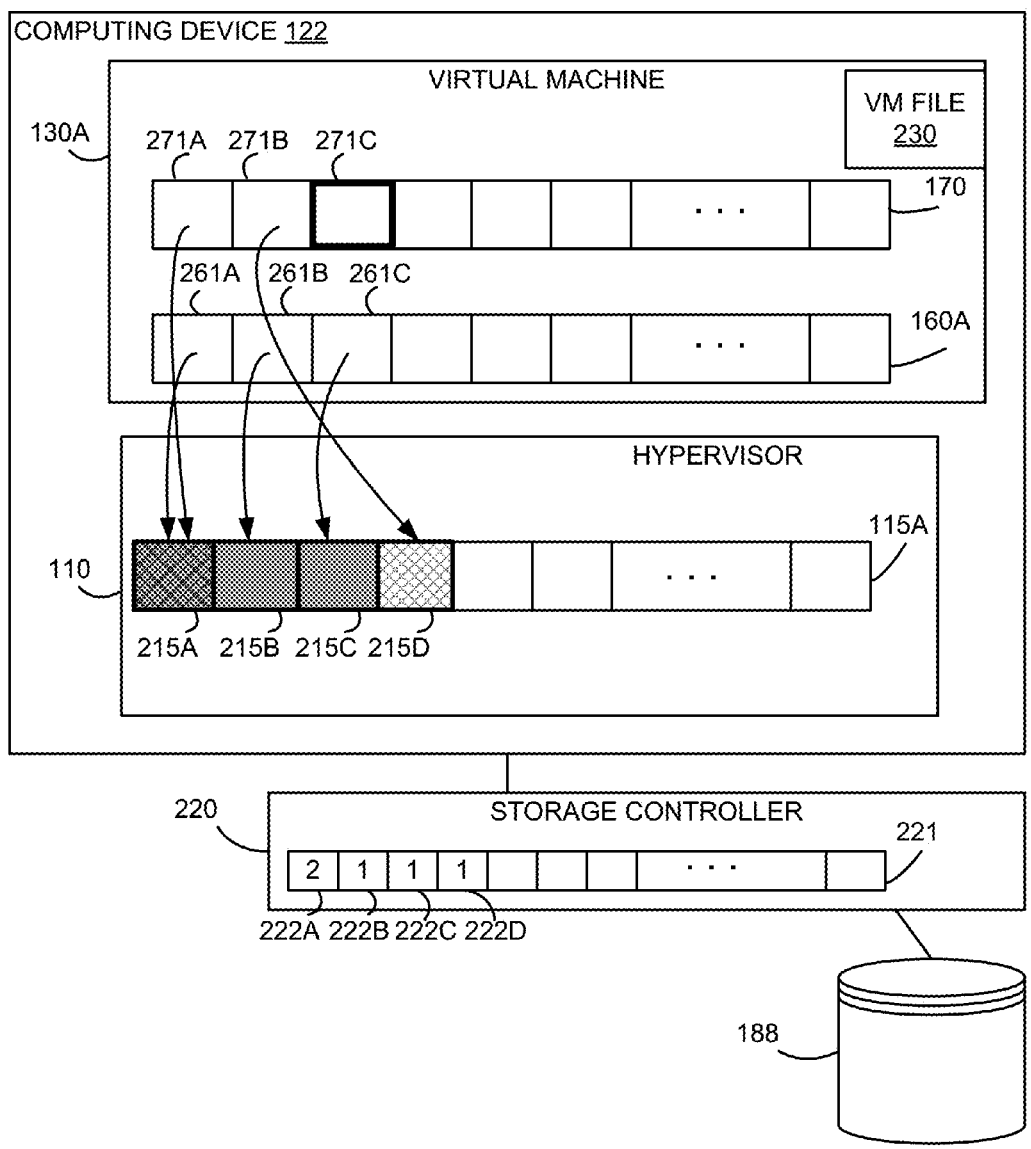

FIG. 2D depicts metadata 160A, 170, data blocks 215, and reference counts 222 for a VM file 230, in accordance with an embodiment of the disclosure. FIG. 2D depicts exemplary VM 130A after the data in data block 215C, in exemplary file 230, has been deleted. Because data block 215C, in this example, is referenced by multiple metadata pointers 261C, 271C, as may be determined by the reference count 222C value being greater than one, hypervisor 110 may, in various embodiments, simply clear the pointer 271C in the metadata 170 of the current version of the file 230. The snapshot version of the data in data block 215C, along with metadata 160A referencing the snapshot version of the data, may remain unchanged. Hypervisor 110 may, in various embodiments, decrement the reference count 222C value for data block 215C to reflect that metadata 170 (reflecting the current version of exemplary file 230) no longer references data block 215C.

Figure 2E:
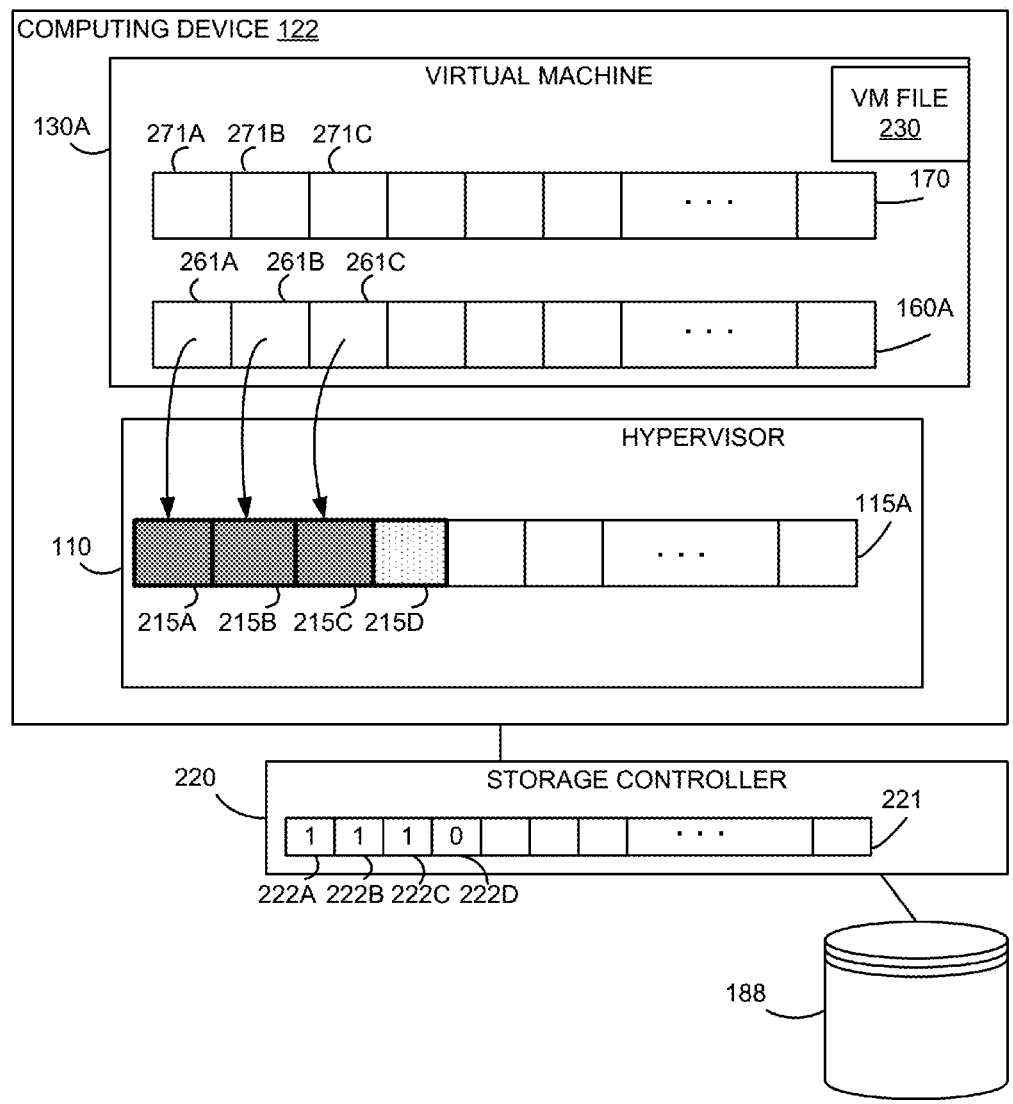

FIG. 2E depicts metadata 160A, 170, data blocks 215, and reference counts 222 for a VM file 230, in accordance with an embodiment of the disclosure. FIG. 2E depicts exemplary VM 130A after a roll-back of exemplary file 230 to the snapshot version. Hypervisor 110 may, in various embodiments, decrement the reference count 222 values for each data block 215 pointed to by metadata 170 and clear the pointers 271 in metadata 170. Hypervisor 110 may delete metadata 170, again making metadata 160A the reference to the current version of exemplary file 230. Any data blocks 215, such as data block 215D, which are unreferenced (reference count 222 value equal to zero) may, in various embodiments, be freed when garbage collector 140 next executes. In various embodiments, the time and resource needed to roll back to the snapshot version of exemplary file 230 may not be dependent on the amount of data changed after the snapshot was created, making snapshot roll back O(1).

Figure 2F:
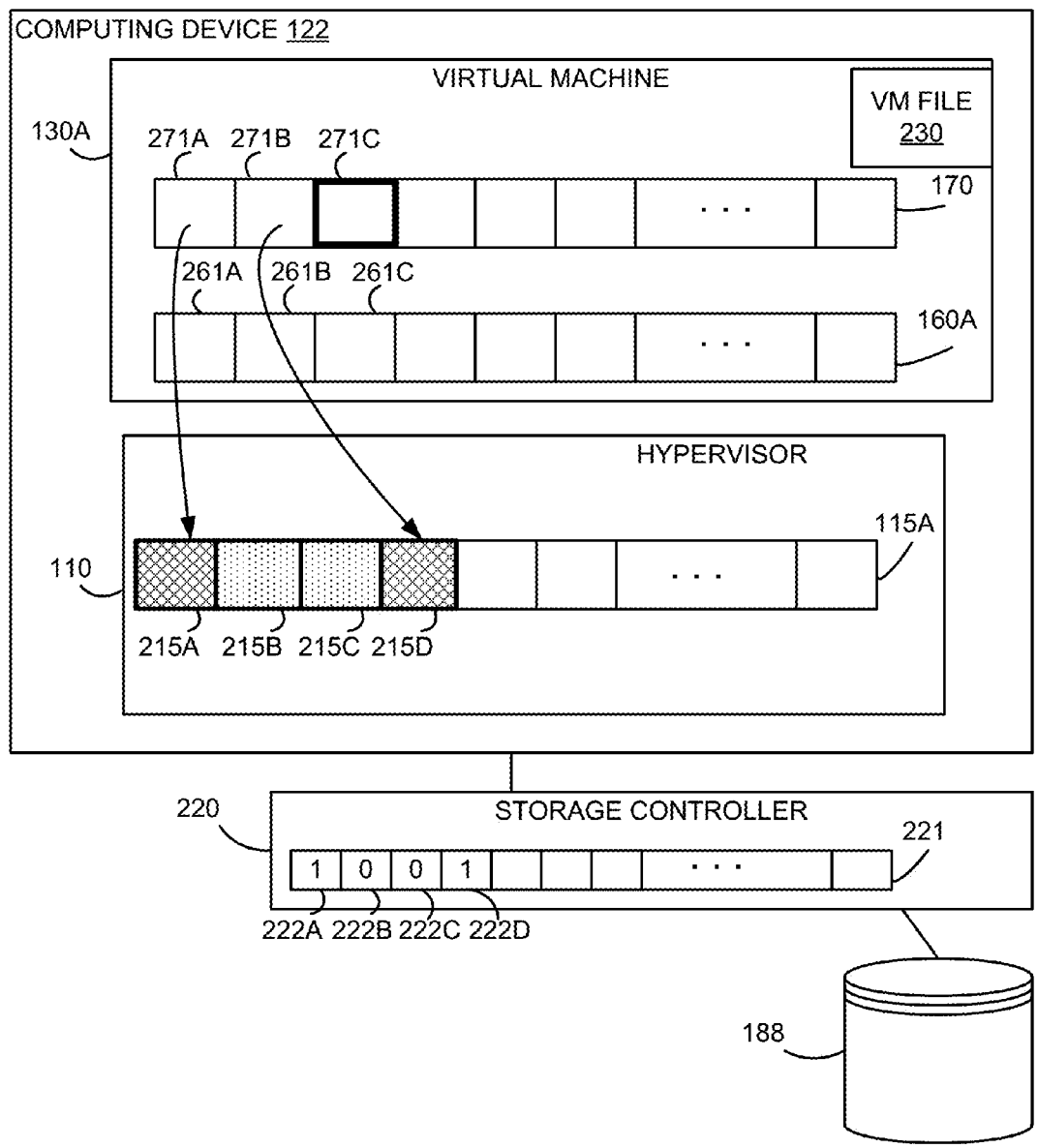

FIG. 2F depicts metadata 160A, 170, data blocks 215, and reference counts 222 for a VM file 230, in accordance with an embodiment of the disclosure. FIG. 2F depicts exemplary VM 130A after a deletion of the snapshot version of exemplary file 230. Hypervisor 110 may, in various embodiments, decrement the reference count 222 values for each data block 215 pointed to by metadata 160A and clear the pointers 261 in metadata 160A. Hypervisor 110 may delete metadata 160A. Any data blocks 215, such as data block 215B, that were modified in the current version, and 215C, that were deleted in the current version, may be unreferenced (reference count 222 values equal to zero) and may, in various embodiments, be freed when garbage collector 140 next executes. In various embodiments, the time and resource needed to delete the snapshot version of exemplary file 230 may not be dependent on the amount of data changed after the snapshot was created, making snapshot version delete O(1).

Figure 3A:
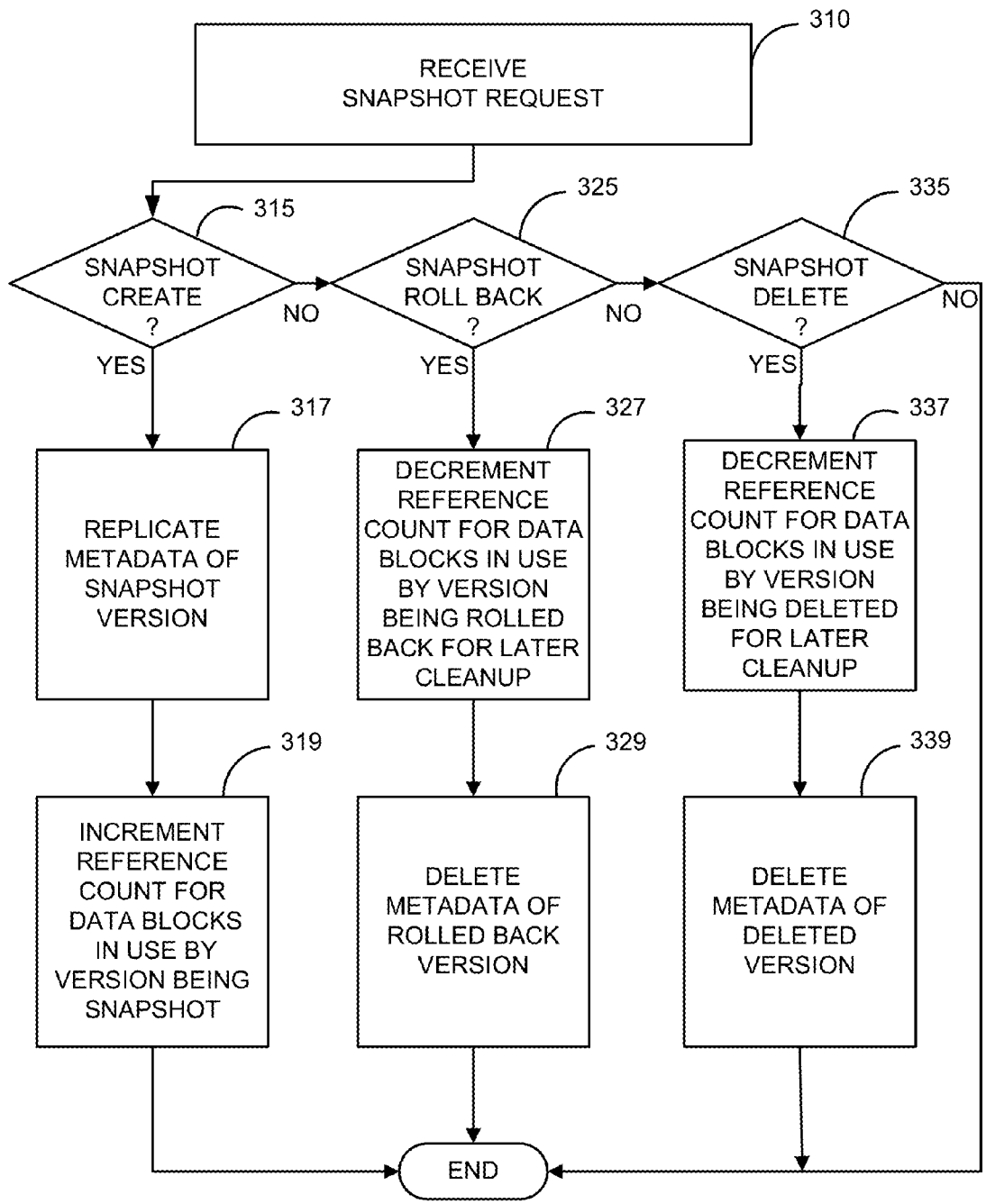
FIG. 3A is a flowchart illustrating snapshot management in a virtual machine environment, in accordance with an embodiment of the disclosure.

FIG. 3A is a flowchart illustrating snapshot management in a virtual machine environment, in accordance with an embodiment of the disclosure. In various embodiments, hypervisor 110 may, at 310, receive a snapshot request for a VM 130. The request may be a request to create a snapshot version of a VM 130 file, file system or an entire VM 130 memory, system state and file system. The request may be a request to roll back any changes made after a snapshot was created and revert the file, file system, memory, and/or system state back to the snapshot version. The request may be a request to delete a snapshot version of the file, file system, memory, and/or system state.

If the request is to create a snapshot version, as determined at 315, hypervisor 110 may, at 317, create a new metadata 170 which is a replica of metadata 160, both metadata 160 and metadata 170 referencing the data blocks 215 in use by the file 320, file system, memory, and/or system state being snapshot. Hypervisor 110 may, at 319, increment the reference count 222 values for those data blocks 215 in use by one, to indicate a new version of the file 230, file system, memory, and/or system state may be referencing those data blocks 215. The snapshot create may now be complete, and the VM 130 requesting the create may continue processing.

If the hypervisor 110 determines, at 315, the request is not a snapshot create, but instead determines, at 325, the request is a request to roll back from a changed version to a snapshot version, hypervisor 110 may, at 327, decrement the reference count 222 values, by one, for any data blocks 215 in use by the version of the file 230, file system, memory, and/or system state being rolled back. Any data blocks 215 added or modified in the version being rolled back, after the snapshot was created, may now have reference count 222 values equal to zero and may be eligible to be freed by garbage collector 140, when garbage collector 140 next executes. Hypervisor 110 may, at 329, delete the metadata 170 created for the version of the file 320, file system, memory, and/or system state being rolled back. The snapshot roll back may now be complete, and the VM 130 requesting the roll back may continue processing.

If the hypervisor 110 determines, at 325, the request is not a snapshot roll back, but instead determines, at 335, the request is a request to delete a snapshot version, hypervisor 110 may, at 337, decrement the reference count 222 value by one, for any data blocks 215 in use by the version of the file 230, file system, memory, and/or system state being deleted. Any data blocks 215 in the snapshot version that were deleted or modified in the current version may now have reference count 222 values equal to zero and may be eligible to be freed by garbage collector 140, when garbage collector 140 next executes. Hypervisor 110 may, at 339, delete the metadata 160 for the snapshot version of the file 320, file system, memory, and/or system state being deleted. The snapshot delete back may now be complete, and the VM 130 requesting the delete may continue processing.

Figure 3B:
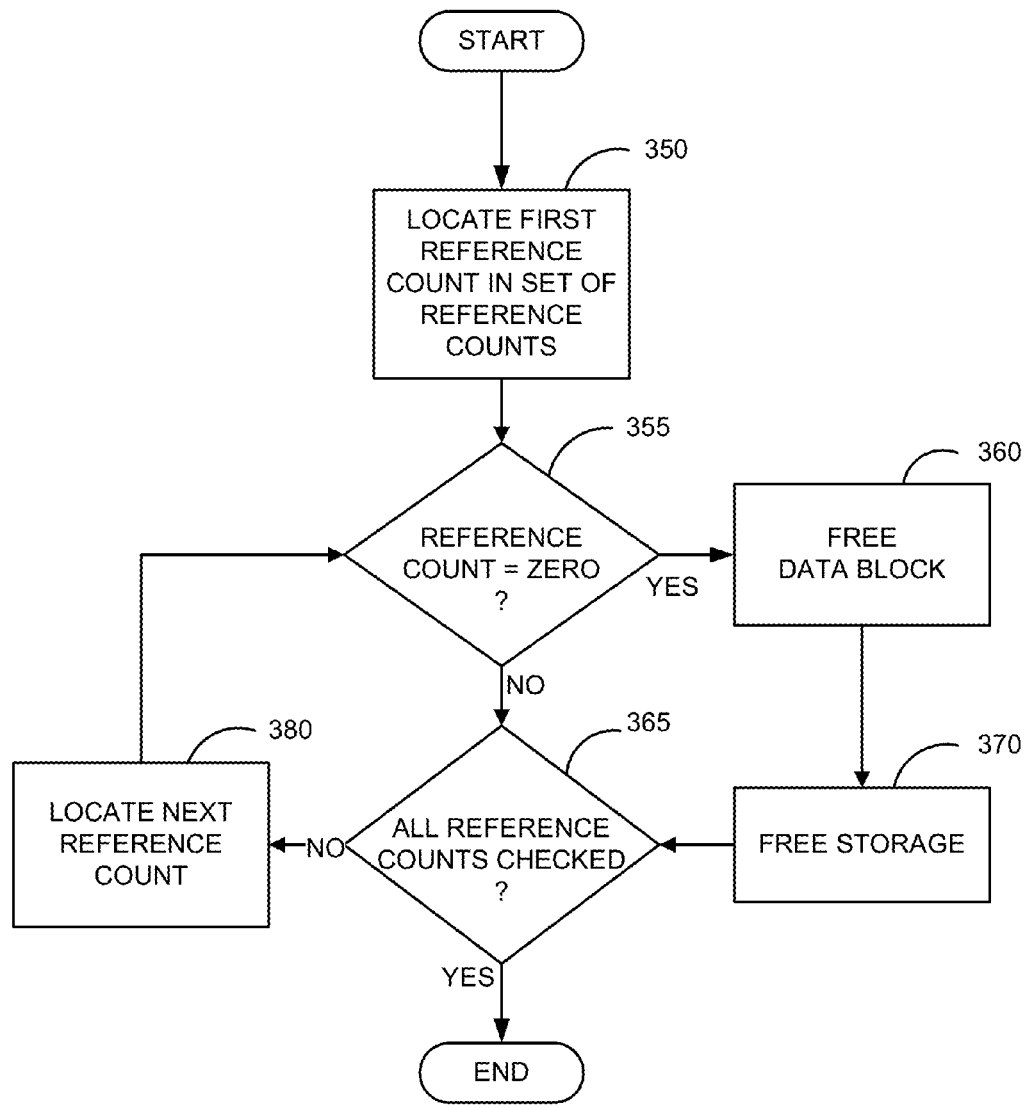
FIG. 3B is a flowchart illustrating garbage collection, in accordance with an embodiment of the disclosure.

FIG. 3B is a flowchart illustrating garbage collection, in accordance with an embodiment of the disclosure. In various embodiments, garbage collector 140 may periodically execute to free unreferenced data blocks 215 in hypervisor 110 and unreferenced storage in storage 188. Garbage collector 140 may determine one or more data blocks 215 and storage are unreferenced by checking the set of reference counts 221. In various embodiments, garbage collector 140 may, at 350, locate the first reference count 222 in the set of reference counts 221. If garbage collector 140 determines, at 355, that the located reference count 222 value is zero (indicating the data is no longer in use by any VM 130), garbage collector 140 may free, at 360, the hypervisor 110 data block 215 associated with the reference count 222 whose value is zero, and free, at 370, the storage in storage 188 where the unused data was stored.

After, garbage collector 140 either determines, at 355, that the reference count 222 value does not equal zero or frees the unused resources, at 360 and 370, garbage collector 140 determines, at 365, if there are additional reference counts 222 to be checked. If, at 365, garbage collector 140 determines additional reference counts 222 are to be checked, garbage collector 140 may, at 380, locate the next reference count 222 to be checked and continue the search for resources to be freed. In various embodiments, when all reference counts 222 have been checked, garbage collection 140 completes.

Figure 4:
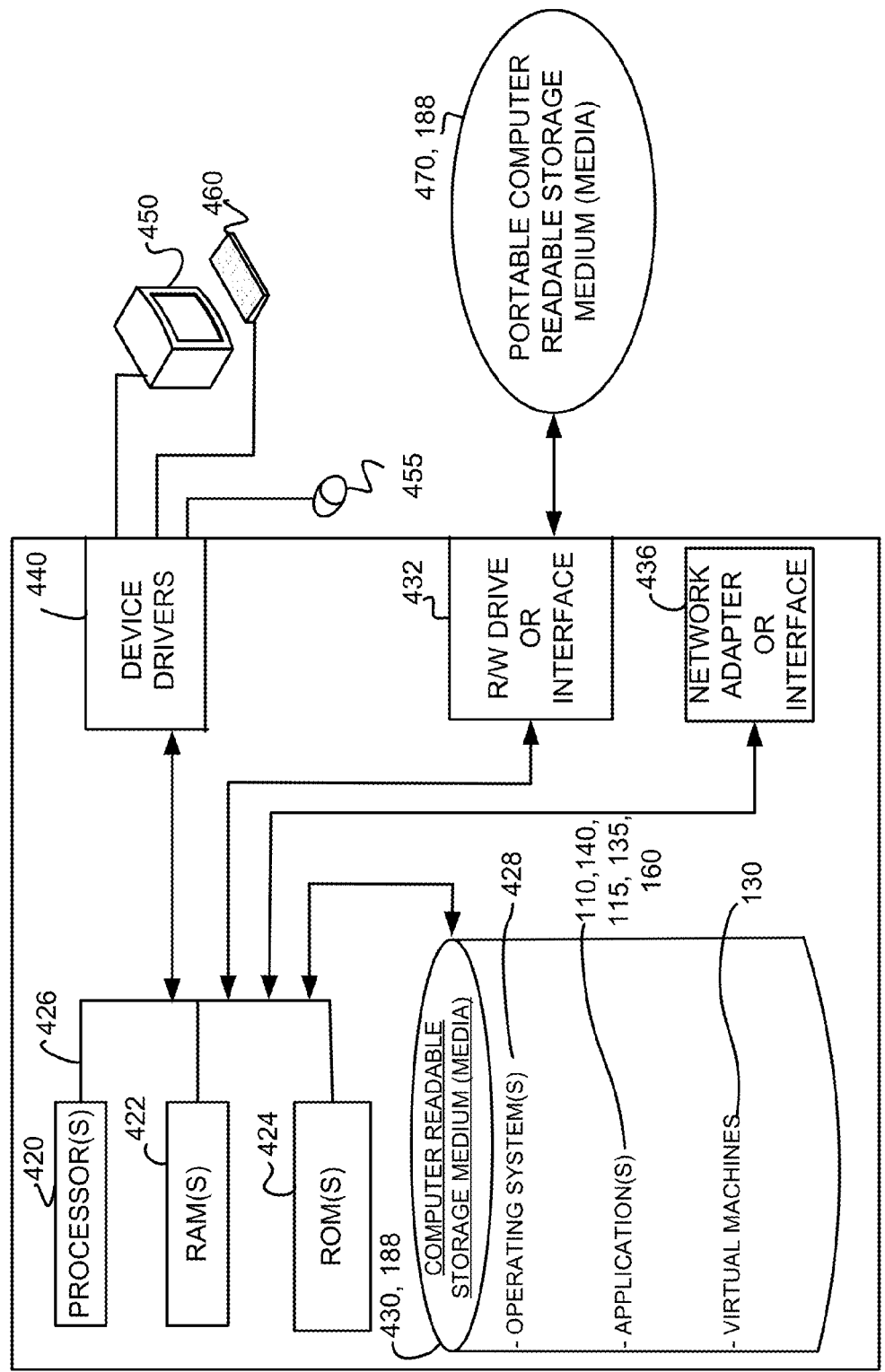
FIG. 4 depicts a block diagram of components of a computing device, in accordance with an embodiment of the disclosure.

FIG. 4 depicts a block diagram of components of computing device 122 of FIG. 1, in accordance with an embodiment of the disclosure. It should be appreciated that FIG. 4 provides only an illustration of one implementation and does not imply any limitations with regard to the environments in which different embodiments may be implemented. Many modifications to the depicted environment may be made.

Computing device 122 can include one or more processors 420, one or more computer-readable RAMs 422, one or more computer-readable ROMs 424, one or more computer readable storage medium 430, device drivers 440, read/write drive or interface 432, and network adapter or interface 436, all interconnected over a communications fabric 426. Communications fabric 426 can be implemented with any architecture designed for passing data and/or control information between processors (such as microprocessors, communications and network processors, etc.), system memory, peripheral devices, and any other hardware components within a system.

One or more operating systems 428, hypervisors 110, garbage collectors 140, virtual machines 130, sets of data blocks 115, virtual disks 135, metadata 160, and storage 188 are stored on one or more of the computer-readable storage medium 430, 188 for execution by one or more of the processors 420 via one or more of the respective RAMs 422 (which typically include cache memory). In the illustrated embodiment, each of the computer readable storage medium 430, 188 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 432 to read from and write to one or more portable computer readable storage medium 470. Hypervisor 110, garbage collector 140, virtual machine 130, set of data blocks 115, virtual disk 135, metadata 160, and storage 188 can be stored on one or more of the portable computer readable storage medium 470, 188, read via the respective R/W drive or interface 432, and loaded into the respective computer readable storage medium 430.

Computing device 122 can also include a network adapter or interface 436, such as a TCP/IP adapter card or wireless communication adapter (such as a 4G wireless communication adapter using OFDMA technology). Hypervisor 110, garbage collector 140, virtual machine 130, set of data blocks 115, virtual disk 135, metadata 160, and storage 188 can be downloaded to the computing device from an external computer or external storage device via a network (for example, the Internet, a local area network or other, wide area network or wireless network) and network adapter or interface 436. From the network adapter or interface 436, the programs are loaded into the computer readable storage medium 430. The network may comprise copper wires, optical fibers, wireless transmission, routers, firewalls, switches, gateway computers, and/or edge servers.

Computing device 122 can also include a display screen 450, a keyboard or keypad 460, and a computer mouse or touchpad 455. Device drivers 440 interface to display screen 450 for imaging, to keyboard or keypad 460, to computer mouse or touchpad 455, and/or to display screen 450 for pressure sensing of alphanumeric character entry and user selections. The device drivers 440, R/W drive or interface 432, and network adapter or interface 436 can comprise hardware and software (stored in computer readable storage medium 430 and/or ROM 424).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer-implemented method for managing a virtual machine snapshot in O(1) time, the method comprising:
   initially storing data, by a computer host operating system, from a virtual machine executing under the host operating system, to a first host operating system managed data block;
   creating, by the computer host operating system, a first pointer that points to the first host operating system managed data block, thereby associating the virtual machine to the data stored in the first host operating system managed data block;
   initializing, by the computer host operating system, a first reference count associated with the first host operating system managed data block, indicating the number of pointers created to associate the virtual machine to the first host operating system managed data block;
   in response to receiving, by the computer host operating system, a request to create a snapshot of the virtual machine:
      creating, by the computer host operating system, a second pointer replicating the first pointer; and
      incrementing, by the computer host operating system, the first reference count associated with the first host operating system managed data block.

2. The method according to claim 1, further comprising:
   in response to receiving, by the computer host operating system, an initial request from the virtual machine to update the data stored in the first host operating system managed data block:
      storing the updated data received from the virtual machine, by the computer host operating system, to a second host operating system managed data block;
      adjusting the second pointer, by the computer host operating system, to point to the second host operating system managed data block, thereby associating the virtual machine to the updated data stored in the second host operating system managed data block;
      initializing, by the computer host operating system, a second reference count associated with the second host operating system managed data block, indicating the number of pointers created to associate the virtual machine to the second host operating system managed data block; and
      decrementing, by the computer host operating system, the first reference count associated with the first host operating system managed data block; and
   in response to receiving, by the computer host operating system, a request from the virtual machine to delete the data stored in the first host operating system managed data block:
      adjusting the second pointer, by the computer host operating system, to not point to the first host operating system managed data block; and
      decrementing, by the computer host operating system, the first reference count associated with the first host operating system managed data block.

3. The method according to claim 2, further comprising:
   in response to receiving, by the computer host operating system, a request to roll back the snapshot of the virtual machine:
      decrementing, by the computer host operating system, the first reference count associated with the first host operating system managed data block if the second pointer points to the first host operating system data block, or the second reference count associated with the second host operating system managed data block if the second pointer points to the second host operating system data block; and
      in response to the second reference count associated with the second host operating system managed data block indicating no second pointers point to the second host operating system managed data block, releasing the second host operating system managed data block, by the computer host operating system, asynchronous to the second reference count indicating no second pointers point to the second host operating system managed data block.

4. The method according to claim 2, further comprising:
   in response to receiving, by the computer host operating system, a request to delete the snapshot of the virtual machine:
      decrementing, by the computer host operating system, the first reference count associated with the first host operating system managed data block; and
      in response to the first reference count associated with the first host operating system managed data block indicating no first or second pointers point to the first host operating system managed data block, releasing the first host operating system managed data block, by the computer host operating system, asynchronous to the first reference count indicating no first or second pointers point to the first host operating system managed data block.

5. The method according to claim 3, further comprising adjusting the second pointer, by the computer host operating system, to not point to the first host operating system managed data block nor the second host operating system managed second data block.

6. The method according to claim 4, further comprising adjusting the first pointer, by the computer host operating system, to not point to the first host operating system managed data block.

7. The method according to claim 1, wherein the snapshot of the virtual machine includes one or more of:
   a virtual machine file;
   a virtual machine file system;
   a virtual machine system state; and
   a virtual machine memory.

8. A computer program product for managing a virtual machine snapshot in O(1) time, the computer program product comprising one or more computer readable storage media and program instructions stored on at least one of the one or more computer readable storage media, the program instructions comprising:
   program instructions to initially store data, by a computer host operating system, from a virtual machine executing under the host operating system, to a first host operating system managed data block;
   program instructions to create, by the computer host operating system, a first pointer that points to the first host operating system managed data block and associates the virtual machine to the data stored in the first host operating system managed data block;
   program instructions to initialize, by the computer host operating system, a first reference count associated with the first host operating system managed data block, indicating the number of pointers created to associate the virtual machine to the first host operating system managed data block;
   program instructions to receive, by the computer host operating system, a request to create a snapshot of the virtual machine;
   program instructions to create, by the computer host operating system, a second pointer replicating the first pointer; and
   program instructions to increment, by the computer host operating system, the first reference count associated with the first host operating system managed data block.

9. The computer program product according to claim 8, further comprising:
   program instructions, in response to receiving, by the computer host operating system, an initial request from the virtual machine to update the data stored in the first host operating system managed data block, to:
      store the updated data received from the virtual machine, by the computer host operating system, to a second host operating system managed data block;
      adjust the second pointer, by the computer host operating system, to point to the second host operating system managed data block, thereby associating the virtual machine to the updated data stored in the second host operating system managed data block;
      initialize, by the computer host operating system, a second reference count associated with the second host operating system managed data block, indicating the number of pointers created to associate the virtual machine to the second host operating system managed data block; and
      decrement, by the computer host operating system, the first reference count associated with the first host operating system managed data block; and
   program instructions, in response to receiving, by the computer host operating system, a request from the virtual machine to delete the data stored in the first host operating system managed data block, to:
      adjust the second pointer, by the computer host operating system, to not point to the first host operating system managed data block; and
      decrement, by the computer host operating system, the first reference count associated with the first host operating system managed data block.

10. The computer program product according to claim 9, further comprising:
   program instructions, in response to receiving, by the computer host operating system, a request to roll back the snapshot of the virtual machine, to:
      decrement, by the computer host operating system, the first reference count associated with the first host operating system managed data block if the second pointer points to the first host operating system data block, or the second reference count associated with the second host operating system managed data block if the second pointer points to the second host operating system data block; and
      in response to the second reference count associated with the second host operating system managed data block indicating no second pointers point to the second host operating system managed data block, program instructions to release the second host operating system managed data block, by the computer host operating system, asynchronous to the second reference count indicating no second pointers point to the second host operating system managed data block.

11. The computer program product according to claim 9, further comprising:
   program instructions, in response to receiving, by the computer host operating system, a request to delete the snapshot of the virtual machine, to:
      decrement, by the computer host operating system, the first reference count associated with the first host operating system managed data block; and
      in response to the first reference count associated with the first host operating system managed data block indicating no first or second pointers point to the first host operating system managed data block, program instructions to release the first host operating system managed data block, by the computer host operating system, asynchronous to first reference count indicating no first or second pointers point to the first host operating system managed data block.

12. The computer program product according to claim 10, further comprising program instructions to adjust the second pointer, by the computer host operating system, to not point to the first host operating system managed data block nor the second host operating system managed second data block.

13. The computer program product according to claim 11, further comprising program instructions to adjust the first pointer, by the computer host operating system, to not point to the first host operating system managed data block.

14. The computer program product according to claim 8, wherein the snapshot of the virtual machine includes one or more of:
   a virtual machine file;
   a virtual machine file system;
   a virtual machine system state; and
   a virtual machine memory.

15. A computer system for managing a virtual machine snapshot in O(1) time, the computer system comprising one or more processors, one or more computer readable memories, one or more computer readable tangible storage media, and program instructions stored on at least one of the one or more storage media for execution by at least one of the one or more processors via at least one of the one or more memories, the program instructions comprising:

program instructions to initially store data, by a computer host operating system, from a virtual machine executing under the host operating system, to a first host operating system managed data block;

program instructions to create, by the computer host operating system, a first pointer that points to the first host operating system managed data block, thereby associating the virtual machine to the data stored in the first host operating system managed data block;

program instructions to initialize, by the computer host operating system, a first reference count associated with the first host operating system managed data block, indicating the number of pointers created to associate the virtual machine to the first host operating system managed data block;

program instructions, in response to receiving, by the computer host operating system, a request to create a snapshot of the virtual machine to:

create, by the computer host operating system, a second pointer replicating the first pointer; and increment, by the computer host operating system, the first reference count associated with the first host operating system managed data block.

16. The computer system according to claim 15, further comprising:

program instructions, in response to receiving, by the computer host operating system, an initial request from the virtual machine to update the data stored in the first host operating system managed data block, to:

store the updated data received from the virtual machine, by the computer host operating system, to a second host operating system managed data block;

adjust the second pointer, by the computer host operating system, to point to the second host operating system managed data block, thereby associating the virtual machine to the updated data stored in the second host operating system managed data block;

initialize, by the computer host operating system, a second reference count associated with the second host operating system managed data block, indicating the number of pointers created to associate the virtual machine to the second host operating system managed data block; and decrement, by the computer host operating system, the first reference count associated with the first host operating system managed data block; and program instructions, in response to receiving, by the computer host operating system, a request from the virtual machine to delete the data stored in the first host operating system managed data block, to:

adjust the second pointer, by the computer host operating system, to not point to the first host operating system managed data block; and decrement, by the computer host operating system, the first reference count associated with the first host operating system managed data block.

17. The computer system according to claim 16, further comprising:

program instructions, in response to receiving, by the computer host operating system, a request to roll back the snapshot of the virtual machine, to:

decrement, by the computer host operating system, the first reference count associated with the first host operating system managed data block if the second pointer points to the first host operating system data block, or the second reference count associated with the second host operating system managed data block if the second pointer points to the second host operating system data block; and in response to the second reference count associated with the second host operating system managed data block indicating no second pointers point to the second host operating system managed data block, program instructions to release the second host operating system managed data block, by the computer host operating system, asynchronous to the second reference count indicating no second pointers point to the second host operating system managed data block.

18. The computer system according to claim 16, further comprising:

program instructions, in response to receiving, by the computer host operating system, a request to delete the snapshot of the virtual machine, to:

decrement, by the computer host operating system, the first reference count associated with the first host operating system managed data block; and in response to the first reference count associated with the first host operating system managed data block indicating no first or second pointers point to the first host operating system managed data block, program instructions to release the first host operating system managed data block, by the computer host operating system, asynchronous to the first reference count indicating no first or second pointers point to the first host operating system managed data block.

19. The computer system according to claim 17, further comprising program instructions to adjust the second pointer, by the computer host operating system, to not point to the first host operating system managed data block nor the second host operating system managed second data block.

20. The computer system according to claim 18, further comprising program instructions to adjust the first pointer, by the computer host operating system, to not point to the first host operating system managed data block.

* * * * *